(12) United States Patent
Fogolin (10) Patent No.: US 9,591,947 B2
(45) Date of Patent: Mar. 14, 2017

(54) SMOKELESS BARBECUE

(75) Inventor: Stefano Fogolin, San Vito al Tagliamento (IT)

(73) Assignee: ELECTROLUX PROFESSIONAL S.P.A., Pordenone (IT)

( * ) Notice: Subject to any disclaimer, the term of this patent is extended or adjusted under 35 U.S.C. 154(b) by 1187 days.

(21) Appl. No.: 13/062,775

(22) PCT Filed: Sep. 10, 2008

(86) PCT No.: PCT/EP2008/007401
§ 371 (c)(1),
(2), (4) Date: May 27, 2011

(87) PCT Pub. No.: WO2010/028665
PCT Pub. Date: Mar. 18, 2013

(65) Prior Publication Data
US 2011/0219957 A1   Sep. 15, 2011

(51) Int. Cl.
*A47J 37/07* (2006.01)

(52) U.S. Cl.
CPC ........ *A47J 37/0704* (2013.01); *A47J 37/0718* (2013.01)

(58) Field of Classification Search
CPC ........................... A47J 37/0704; A47J 37/0718
USPC ..................... 99/400, 444, 446, 447, 450
See application file for complete search history.

(56) References Cited

U.S. PATENT DOCUMENTS

| | | | |
|---|---|---|---|
| 1,765,380 A * | 6/1930 | McGinnis | ........................ 34/99 |
| 3,586,518 A * | 6/1971 | Folmar | ........................... 99/357 |
| 4,454,805 A | 6/1984 | Matthews | |
| 4,762,059 A * | 8/1988 | McLane, Sr. | ....... A47J 37/0682 126/25 R |
| 5,117,747 A | 6/1992 | Kuechler | |
| 5,121,676 A | 6/1992 | Jurgens | |
| 5,566,606 A | 10/1996 | Johnston | |
| 6,260,478 B1 * | 7/2001 | Harneit | .......................... 99/446 |
| 6,371,011 B1 | 4/2002 | Kuechler | |
| 2001/0037802 A1 * | 11/2001 | Feldewerth et al. | ........ 126/41 R |
| 2006/0278210 A1 | 12/2006 | Wang | |

FOREIGN PATENT DOCUMENTS

| | | |
|---|---|---|
| EP | 1444933 | 8/2004 |
| EP | 1680998 | 7/2006 |
| JP | 2003284649 | 10/2003 |
| JP | 2007136042 | 6/2007 |

OTHER PUBLICATIONS

International Search Report for PCT/EP2008/007401 dated Oct. 19, 2009, 2 pages.

* cited by examiner

*Primary Examiner* — Jianying Atkisson
(74) *Attorney, Agent, or Firm* — Pearne & Gordon LLP (57) ABSTRACT

A smokeless barbecue including a grill adapted for receiving food to be cooked thereon and at least one radiating element placed underneath the grill. The radiating element is arranged so as to radiate heat mainly in a direction substantially parallel to the grill. The barbecue further includes at least a reflecting surface facing the radiating element and arranged so as to reflect, towards the grill, the radiating heat coming from the radiating element, and a cover device placed between the grill and the radiating element to shield the radiating element from substances falling from the grill.

15 Claims, 4 Drawing Sheets

SMOKELESS BARBECUE

The present invention refers to a smokeless barbecue, particularly for cooking meat or the like.

Nowadays commonly used barbecues, or broilers, comprise a grill, or grate, on which the food can be placed; underneath the grill are positioned one or more heating elements adapted to transmit the heat to the overlying food.

Particularly in the case of the meat, the better cooking results can be achieved if the heat is transmitted to the food mainly by radiation.

The heating elements are typically electric heaters, or also gas burners, directly heating the overlying food with flames and fumes, or adapted to heat one or more radiating elements (such as a layer of lava rock, or a series of metallic beams) placed underneath the grill, which, once heated, radiate the heat to the food placed on the grill.

These barbecues of known type have however the drawback that, during the grilling of the food, particularly in the case of the meat, grease, juices, drippings, or other inflammable substances coming out from the food, fall down on the hot heating elements, typically catching fire and generating smoke which has an unpleasant smell, and could also be carcinogen.

An example of known barbecue is illustrated in U.S. Pat. No. 5,566,606, which discloses a barbecue grill assembly comprising a bottom casting, or fire box, provided with a cooking grate adapted for receiving food items to be cooked thereon; within the fire box, below the cooking grate, is mounted a gas burner over which is placed a shield which prevents grease or other drippings from falling into the burner ports, so as to avoid the clogging of the latter.

This barbecue grill has however the drawback that the shield is heated by the flames and/or by the hot smokes produced by the underlying gas burner, and so the grease or other drippings, falling down from the grate, could catch fire when they touch the shield.

Moreover, in the barbecue grill disclosed in U.S. Pat. No. 5,566,606, the heat is transmitted to the food mainly by air convection, and so the cooking of the food, particularly in the case of the meat is not optimal.

It is also known U.S. Pat. No. 5,117,747, in which it is disclosed a compact broiler, suitable for cooking meat products, comprising cabinet means open at the top, grill means supported across the top by the cabinet means, radiant heating means and means supporting the same under the grill means, deflector means positioned over the radiant heating means to deflect convective heat therefrom towards the grill means, and supporting means therefore. The broiler also comprises baffle means overlying the deflector means in the plane of the grill means, so as to shield the deflector means and the radiant heating means from grease and other drippings from meat being cooked on the grill means, and means supporting the baffle means in position for that purpose.

Also this solution has however some drawbacks; firstly the heat is transmitted to the food both by radiation and by air convection, and not mainly by radiation as it will be instead required to achieve an optimal cooking of the food.

Furthermore the baffle means lay in the plane of the grill means, reducing the area of the grill means in which the food can be placed, and also worsening the heat distribution.

In addition, the area of the grill means which can be heated by each one of the radiant heating means is narrow, and, as a consequence, to obtain a barbecue of wide dimensions it is necessary to provide a great number of radiant heating means, which increases the complexity and the costs of the broiler.

Another solution developed in order to try to avoid the production of smoke during the grilling, particularly of the meat, is illustrated in U.S. Pat. No. 6,371,011, in which it is disclosed a broiler for cooking meat products while limiting smoke production, comprising a cabinet structure having an upwardly facing grill opening, and a grill, for supporting the meat products, supported across the grill opening. The broiler comprises an elongate heating element spaced below the grill, an elongate radiant element spaced between the heating element and the grill for directing heat laterally from above the heating element, and an inclined trough member spaced between the grill and the radiant element for preventing grease from dripping on the radiant element and the heating element. The trough member has a coolant passage formed therein, means for feeding liquid coolant through the coolant passage, and means for directing grease from a lower end of the trough member to a region below the heating element without contacting either of the radiant element and the heating element.

Also this solution, although quite effective in reducing the production of smoke during the grilling of the meat, has however some drawbacks; in fact the trough members and the means for feeding the liquid coolant through their coolant passages are rather complex and expensive, which increases the costs of the broiler.

In addition, the heating elements disclosed in U.S. Pat. No. 6,371,011 aren't much efficient, because, although they reach high temperatures, they let flow a great part of the hot air coming from the heating elements towards the overlaying trough member, which would reach a very high temperature if it would not be cooled by the liquid coolant; this hot air isn't therefore used for the grilling process, and so it is wasted.

Furthermore, also in this solution a great deal of heat is transmitted to the meat also by air convection, and so the grilling of the meat is not optimal.

Moreover, also in this case each heating element can heat only a narrow area of the grill, and so, to obtain a barbecue of wide dimensions, it is necessary to provide a great number of heating elements, which increases the complexity and costs of the broiler.

It is also known U.S. Pat. No. 5,121,676, in which it is disclosed a barbecue grill for cooking food, comprising a housing means having side walls and a bottom surface, a hood, adapted to enclose the housing means, a heat distribution means spanning the approximate length of the housing means and positioned at or near the lengthwise center line of the housing means. The heat distribution means comprise a tubular heat distribution enclosure means configured relative to one or more openings in the bottom surface of the housing means, and with one or more corresponding openings on their bottom surface, such that the heat distribution means can receive secondary combustion air from outside the housing means; the heat distribution means comprise also a plurality of heat distribution conduits connected to and pointed outward from the heat distribution enclosure means on or about a horizontal plane, such that the heated air from within the heat distribution enclosure means can flow through the heat distribution conduits, and into the interior of the housing means. The barbecue grill comprises a means to supply heat to the interior of the tubular heat distribution enclosure means, and a drip deflection means which prevents grease and juices from the food from dripping on the heat distribution enclosure means and from dripping on the plurality of heat distribution conduits. The barbecue grill comprises also a removable drip collection means positioned below and relative to the drip deflection means to collect the drippings from the food, and a means to support the food within the housing means in a horizontal plane.

Also this solution is affected by some drawbacks; in fact the barbecue grill, particularly the heat distribution means, is very complex and therefore its cost is high.

Furthermore, to obtain a wide barbecue grill it is necessary to provide a wide heat distribution means, with a great increasing of the costs.

Moreover the temperature of the heat distribution conduits is low, and so they transmit heat to the food mainly by air convention, with the above mentioned worsening effect on the grilling of the food.

It is also known US 2006/0278210, in which it is disclosed a smokeless grill for food, comprising a stand and a smokeless grilling arrangement, which comprises a grill rack supported by the stand for supporting the food, and a heat generation module for generating a predetermined amount of radiating heat towards the grill rack for grilling the food thereon in a smokeless manner, so as to provide a non-pollution grilling environment for the food. The smokeless grilling arrangement comprises a heat accumulation housing having a heat reflection cavity substantially receiving the heat generation module therein, such that the radiating heat from the heat generation module is accumulated to reflect towards the grill rack for evenly distributing the radiating heat to the grill rack. The smokeless grilling arrangement further comprises a heat reflector, supported underneath the grill rack, having a heat reflection surface to reflect the radiating heat from the heat accumulation housing back to the grill rack for enhancing a grilling strength for the food. The heat reflection surface of the heat reflector is extended inclinedly and downwardly towards a collection opening for not only guiding the oil residuals flowing towards the collection opening, but also focusing the radiating heat back to the grill rack.

This solution has however the drawback that its manufacturing is rather complex, and so the production costs are high.

In addition the heat distribution on the grill rack isn't homogeneous, which could compromise the grilling of the food.

Moreover it is very difficult to use this solution with wide grill racks.

In U.S. Pat. No. 6,260,478 it is disclosed a heat dissipation system that uses a pair of heat distributing panels rotatably mounted in a grill, which allows a cook to equalize the heat radiated within a gas or electric grill to provide more even heat distribution and prevents wind from extinguishing the burner flame, even in the presence of a crosswind. Each heat distributing panel is arranged to lay diagonally over a tube burner or electric heating element placed underneath a grate, so that the heat rising from below the panel is redirected, to achieve even heating on the entire surface of the grate. To maintain even heat distribution on open grills, the heat distributing panels can be equipped with stub axles that lead to the outside of the grill; a lever or knob can be attached to this axle to allow the angle of the panel to be changed.

This solution presents the drawback that it is very complex and therefore very expensive.

In addition the heat distributing panels, heated by the adjoining tube burner or electric heating element, could reach a high temperature, with the risk to ignite the grease or other drippings falling on them from the grate.

In U.S. Pat. No. 4,454,805 it is disclosed a unit for placing on one or two burners of a gas or electric range, which applies air heated thereby to cook food on an elevated grill while catching fat, juices or sauces in a container kept cool enough by the internal construction thereof to prevent excessive smoking or cooking odors from escaping the unit. This is accomplished by providing a heat deflector, convection current diffuser which passes the heat from the burner around the fat receptacle and convects and radiates the heat onto the food.

Also this solution has some drawbacks; in fact it needs a stove top burner to be used, and isn't adapted to the professional use.

Moreover a great amount of the heat is transmitted to the food by air convection, thus worsening the grilling of the food.

Furthermore the width of the grill cannot be very high.

The aim of the present invention is therefore to obtain a barbecue which allows achieving an optimal grilling of a food, without producing smoke during this grilling.

Within this aim, another object of the invention is the possibility to obtain a simple barbecue with a wide grilling area, associated to moderate production costs.

Another object of the invention is to obtain a barbecue which, if the heating element comprises a gas burner, allows to increase, with respect to the known solutions, the amount of heat transmitted to the food by radiation, so as to improve the grilling of the food.

It is therefore an object of the present invention to solve the above-noted problems, thereby doing away with the drawbacks of the cited prior art.

The Applicant has found that by the use of a radiating element arranged to radiate the heat mainly in a direction substantially parallel to the grill, so as to irradiate at least a reflecting surface adapted to reflect towards the grill the radiating heat, and by placing between the grill and the radiating element a cover device adapted to shield the radiating element from flammable substances coming out from the food and falling from the grill, it is possible to radiate the heat to the food placed on the grill in a very efficient way, so as to obtain an optimal grilling of this food, avoiding at the same time the production of smoke due to the flaming of grease or other flamable substances coming out from the food.

For the purposes of the present inention, with "direction substantially parallel to the grill" it is intended a direction parallel to the grid plane or forming a relatively small angle with an axis that is parallel to the grid plane, so that substantially all or most of the heat generated by the radiating element does not directly irradiate the grid.

In particular, the above-mentioned aim and objects, as well as others that will become better apparent hereinafter, are achieved by a smokeless barbecue comprising a grill, adapted for receiving the food to be cooked thereon, and at least one radiating element placed underneath the grill; the radiating element is arranged so as to radiate the heat mainly in a direction substantially parallel to the grill.

The barbecue further comprises:

at least a reflecting surface facing the radiating element and arranged so as to reflect towards the grill the radiating heat coming from the radiating element, and a cover device placed between the grill and the radiating element to shield the radiating element from substances falling from the grill.

Advantageously the smokeless barbecue further comprises at least a screen, arranged near to at least one radiating side of the radiating element and adapted to laterally shield the radiating side of the radiating element from the substances falling from the grill, the screen being transparent to the radiating heat.

Opportunely, between the screen and the cover device there is a gap.

Preferably the said radiating element has two radiating sides, substantially parallel to each other; the barbecue comprise at least two reflecting surfaces facing respectively these two radiating sides and arranged so as to reflect towards the grill the radiating heat coming from the two radiating sides.

In a further embodiment the smokeless barbecue comprises a single radiating element placed under the grill substantially in correspondence to the medium transversal axis of the grill.

In another embodiment the smokeless barbecue comprises two or more radiating elements, placed under the grill substantially parallel to each other so as to constitute a row of radiating elements, and two or more cover devices each covering a respective one of the radiating elements.

Advantageously, between each couple of contiguous radiating elements there is placed a couple of the reflecting surfaces adapted to reflect towards the grill the radiating heat coming from the radiating elements; sideways to the two radiating elements placed at the extremities of the row there are also placed, externally to the row, respectively two of the reflecting surfaces adapted to reflect towards the grill the radiating heat coming from the radiating elements.

Advantageously the length of the radiating element in the direction of the transversal axis of the grill is substantially equal to the transversal length of the grill, the radiating element being placed in such a way that it is totally covered by the grill.

Opportunely the cover device comprises a substantially reverse V-shaped beam or tile, placed over the radiating element and having a length equal or greater than the latter, so as to completely cover it.

In a further embodiment the radiating element comprises an electric heater.

In another embodiment the radiating element comprises a gas burner and a radiating body, the radiating body being placed over the gas burner and being adapted, when heated by the flame and by the hot fumes produced by the gas burner, to emit heat mainly by radiation, the radiating body being arranged to radiate the heat mainly in a direction substantially parallel to the grill, so as to irradiate the reflecting surface.

In a further embodiment thereof the radiating body comprises a substantially reverse V-shaped radiating plate comprising two divergent substantially plane branches, the free extremities of which being placed in such a way to enclose the flame produced by the gas burner.

Preferably on the external surface of the branches there are obtained some indentations, each forming a lip, protruding from the internal surface of the respective branch, and an opening for the flow of the fumes.

In another embodiment the radiating body comprises a series of oblique slabs placed, preferably staggered, between the gas burner and the cover device.

In a further embodiment the radiating body comprises a substantially vertical plate, hanged over the gas burner and fixed to the overlaying cover device, and two radiating sheets arranged sideways to the substantially vertical plate so as to enclose the latter and the flame produced by the gas burner; a plurality of fins protrude from the substantially vertical plate to improve the heat exchange with the radiating sheets.

Features and advantages of the present invention will anyway be more readily understood from the description that is given below by way of non-limiting example with reference to the accompanying drawings, in which.

Figure 1:
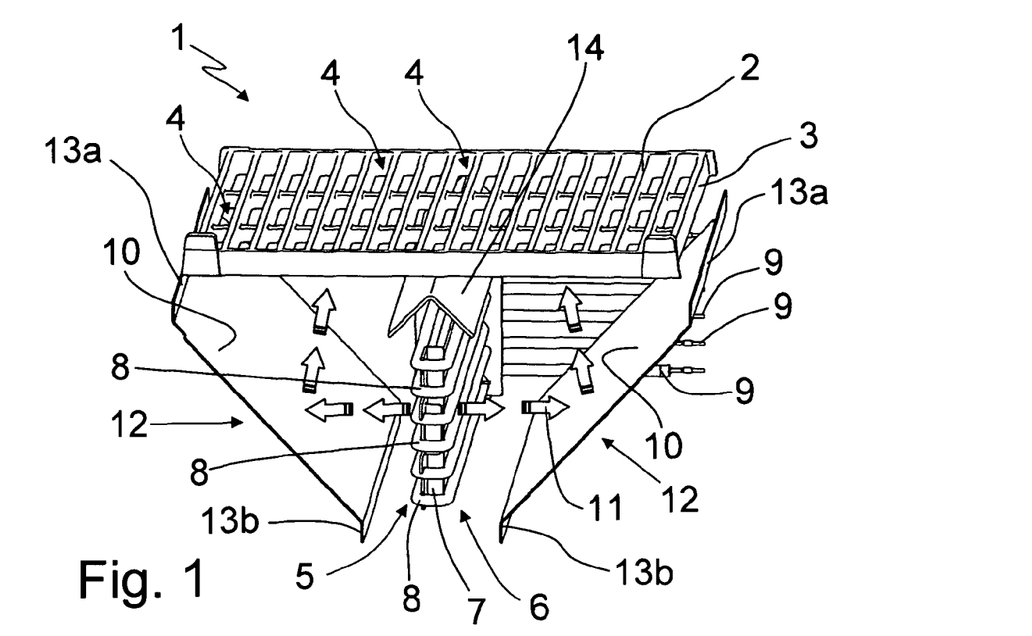
FIG. 1 is a schematic view of a first embodiment of a smokeless barbecue according to the invention.

In FIG. 1 it is schematically illustrated a first embodiment of a smokeless barbecue 1 according to the invention.

The smokeless barbecue 1 comprises a grill 2, adapted for receiving the food to be cooked thereon, which can for example comprise a metal board 3 provided of a series of openings 4 preferably rectangular shaped as in the embodiment illustrated in FIG. 1; the grill 2 could alternatively comprise a series of metallic beams, not illustrated, disposed parallel to each other.

The smokeless barbecue 1 comprises at least one radiating element 5 placed underneath the grill 2.

Advantageously, as illustrated in FIG. 1, the radiating element 5 could be an electric heater 6 comprising a core or support 7, around which there are wound some electrical resistors 8, electrically powered by electric cables 9 connected to a suitable power supply, not illustrated.

Preferably the electric heater 6, and therefore also the electrical resistors 8, are, in a plan view, substantially rectangular.

In the embodiment illustrated in FIG. 1, the electric heater 6 is placed substantially in correspondence to the medium transversal axis of the grill 2.

Advantageously, the radiating element 5 is arranged to radiate the heat mainly in a direction substantially parallel to the grill 2, so as to irradiate a reflecting surface 10 facing at least one radiating side of the radiating element 5, and adapted to reflect towards the grill 2 the radiating heat coming from the radiating element 5.

The main direction of the heat radiated from one of the electrical resistors 8, and reflected from the reflecting surface 10, is schematically represented by the arrows indicated by the reference number 11 in FIG. 1.

Advantageously, as in the embodiment of FIG. 1, there are two reflecting surfaces 10, placed in such a way to face two substantially parallel radiating sides of the radiating element 5. The reflecting surfaces 10 are disposed at an oblique angle with respect to the grill 2.

In the case of the electric heater 6 illustrated in FIG. 1, in which the heat is radiated mainly from the longer sides of the electrical resistors 8, each reflecting surface 10 is placed in such a way to face one of said longer sides of the electrical resistors 8.

The presence of the reflecting surfaces 10 increases the area of the grill 2 which can be reached by the radiating heat emitted from the radiating element 5, allowing to radiate a rather wide grill 2 with a single radiating element 5, in a fairly homogeneous way.

Advantageously, each reflecting surface 10 is a plane surface of a plate 12, substantially plane and preferably metallic, disposed oblique with respect to the grill 2, so as to reflect towards the latter the radiating heat coming from the radiating element 5.

Advantageously, two wings 13a, 13b may protrude from the upper and the lower extremities of each plate 12 respectively; these two wings may be substantially parallel to each other and substantially perpendicular to the grill 2, and may be placed one externally to one lateral side of the grill 2, and the other near the bottom of the radiating element 5.

Advantageously, between the grill 2 and the radiating element 5 there is placed a cover device 14 adapted to shield the radiating element 5 from flammable substances, such as grease, juices, drippings, etc., coming out from the food and falling from the grill 2.

The cover device 14 could opportunely comprise a substantially reverse V-shaped beam or tile, placed over the radiating element 5 and having a length equal or greater than the latter, so as to completely cover it.

Preferably, near to one or both radiating sides of the radiating element 5 there could be placed a screen, not illustrated in FIG. 1, adapted to laterally shield the radiating side from the flammable substances coming out from the food and falling down from the grill 2; this screen would be opportunely transparent to the radiating heat, so as to allow the radiating heat generated by the radiating element 5 to reach the reflecting surface 10.

Figure 2:
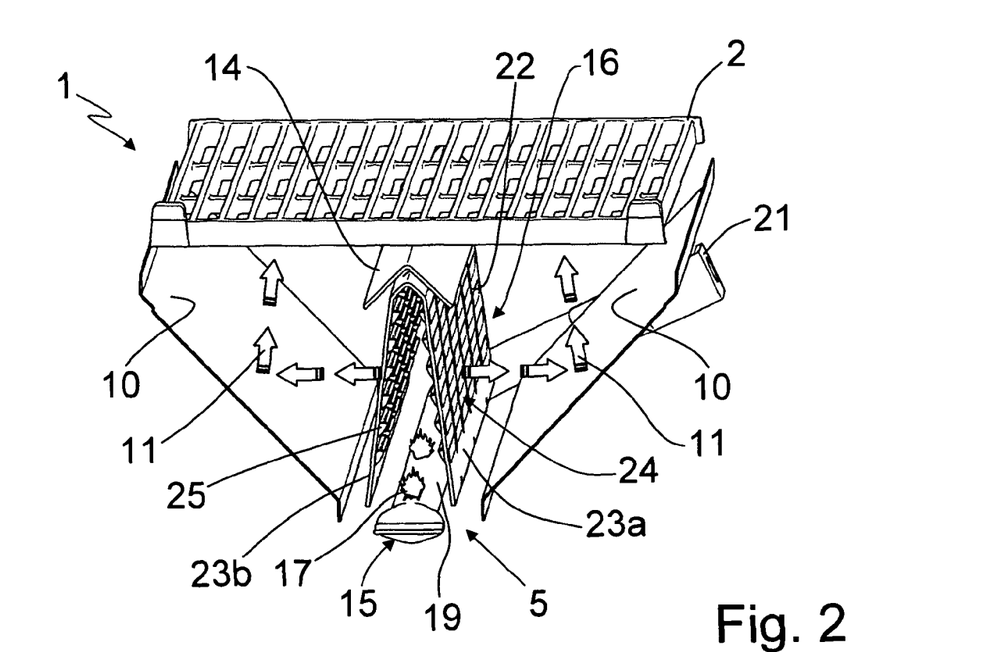
FIG. 2 is a schematic view of a second embodiment of a smokeless barbecue according to the invention.
Figure 3:
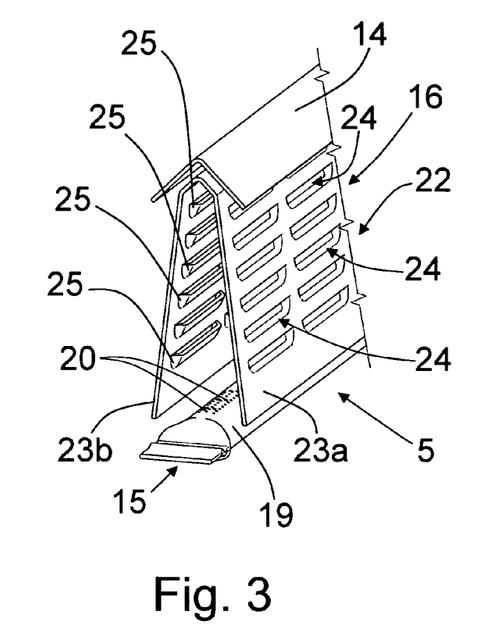
FIG. 3 is a prospective view of the radiating element of the smokeless barbecue illustrated in FIG. 2.
Figure 4:
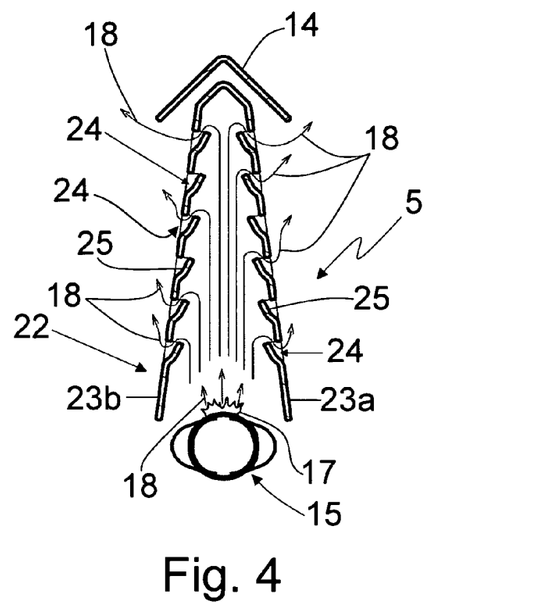
FIG. 4 is a frontal view of the radiating element of FIG. 3.

In FIGS. 2, 3 and 4 it is illustrated another embodiment of a smokeless barbecue 1 according to the invention, which differs from the embodiment illustrated in FIG. 1 only because of the radiating element 5; in fact in this case the radiating element 5 comprises a gas burner 15, over which it is placed a radiating body 16 adapted, when heated by the flame 17 and by the hot fumes 18 produced by the gas burner 15, to emit heat mainly by radiation.

Advantageously, the radiating body 16 is arranged to radiate the heat mainly in a direction substantially parallel to the grill 2, so as to irradiate a reflecting surface 10 facing at least one radiating side of the radiating element 5, and adapted to reflect towards the grill 2 the radiating heat coming from the radiating element 5.

The main directions of the heat radiated from two opposite regions of the radiating body 16, and reflected by the reflecting surface 10, are schematically indicated by the arrows indicated by the reference number 11 in FIG. 2.

In the embodiment illustrated in FIGS. 2, 3 and 4, the gas burner 15 comprises at least one pipe 19, substantially parallel to the grill 2, and substantially perpendicular to the longitudinal axis of the latter; preferably the pipe 19 is placed substantially in correspondence to the medium transversal axis of the grill 2.

On the lateral surface of the pipe 19, towards the grill 2, there are provided some openings 20, illustrated in FIG. 3, adapted for emitting the gas to be burned.

To one end of the pipe 19 there is fluidly connected a gas conveying tube 21, protruding outside the area covered by the grill 2, and adapted to deliver the gas to the pipe 19.

In the embodiment illustrated in FIGS. 2, 3 and 4, the radiating body 16 advantageously comprises a substantially reverse V-shaped radiating plate 22, preferably metallic, comprising two divergent substantially plane branches, indicated with the reference number 23a, 23b, the free extremities of which are placed over and laterally to the openings 20 obtained in the pipe 19, so as to enclose the flame 17 produced by the gas burner 15.

Advantageously, the length of the radiating plate 22 in the direction of the pipe 19 is substantially equal to the transversal width of the grill 2, and the radiating plate 22 is placed in such a way that it is totally covered by the grill 2.

Opportunely, on the external surface of the branches 23a, 23b, there are obtained some indentations, each forming a lip 25 protruding from the internal surface of the respective branch 23a, 23b, and an opening 24 for the flow of fumes 18.

Also in this embodiment, between the grill 2 and the radiating element 5 there is placed a cover device 14, substantially analogous to which described with reference to FIG. 1, adapted to shield the radiating element 5 from flammable substances, such as grease, juices, drippings, sauces, etc., coming out from the food and falling from the grill 2.

As illustrated in FIG. 4, the hot fumes 18, produced by the flame 17, rise between the two branches 23a, 23b of the radiating plate 22, and collide with the internal surface of the branches 23a, 23b, and with the lips 25, transferring to them the most part of their heat; so the branches 23a, 23b increase their temperature, and starts radiating heat, mainly in a direction substantially parallel to the grill 2, so as to irradiate the reflecting surfaces 10.

The presence of the lips 25 increases the heat exchanging area with the fumes 18 and the turbulence of the fumes 18, thus improving the heat exchange between the latter and the branches 23a, 23b; in this way a great amount of the heat of the fumes 18 is transferred to the branches 23a, 23b to be subsequently radiated.

The fumes 18, cooled by the contact with the branches 23a, 23b and with the lips 25, exit from the openings 24, at a relatively low temperature, adapted not to overheat the overlying cover device 14.

Also in this embodiment, next to one or both radiating sides of the radiating element 5 there could be placed a screen, not illustrated in FIGS. 2, 3 and 4, transparent to the radiating heat and adapted to laterally shield the contiguous radiating side from the flammable substances coming out from the food and falling from the grill 2.

Figure 5:
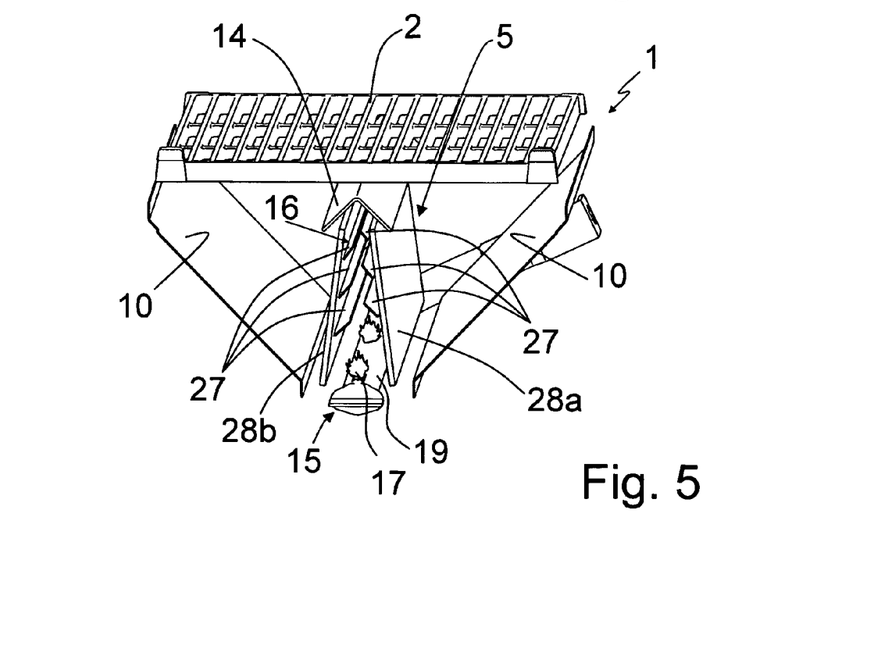
FIG. 5 is a schematic view of a third embodiment of a smokeless barbecue according to the invention.

In FIG. 5 it is illustrated another embodiment of a smokeless barbecue 1 according to the invention, which differs from the embodiment illustrated in FIGS. 2, 3 and 4 only because of the radiating body 16, which, in this case, comprises advantageously a series of oblique slabs 27, advantageously metallic, placed, preferably staggered, between the gas burner 15 and the cover device 14 by apposite support devices, not illustrated.

Near to the two radiating side of the radiating element 5, here comprising the gas burner 15 and the oblique slabs 27, there are placed respectively two screens 28a, 28b transparent to the radiating heat and adapted to laterally shield the contiguous radiating side of the radiating element 5 from the flammable substances coming out from the food and falling from the grill 2.

Advantageously, the screens 28a, 28b are not in direct contact with the overlying cover device 14, in such a way that between these elements there is obtained a gap.

Advantageously the screens 28a, 28b could be made of transparent glass.

Also in this embodiment the length of the radiating body 16 in the direction of the pipe 19 is substantially equal to the transversal width of the grill 2, and the radiating body 16 is placed in such a way that it is totally covered by the grill 2.

In this embodiment the hot fumes produced by the flame 17 rise between the two screens 28a, 28b, colliding with the slabs 27 and transferring to the latter the most part of their heat; therefore the slabs 27 increase their temperature, and starts radiating heat, mainly in a direction substantially parallel to the grill 2, so as to irradiate the reflecting surfaces 10.

The fumes, cooled by the contact with the slabs 27 exit from the gaps between the two screens 28a, 28b and the cover device 14 at a relatively low temperature, adapted not to overheat the overlying cover device 14.

Figure 6:
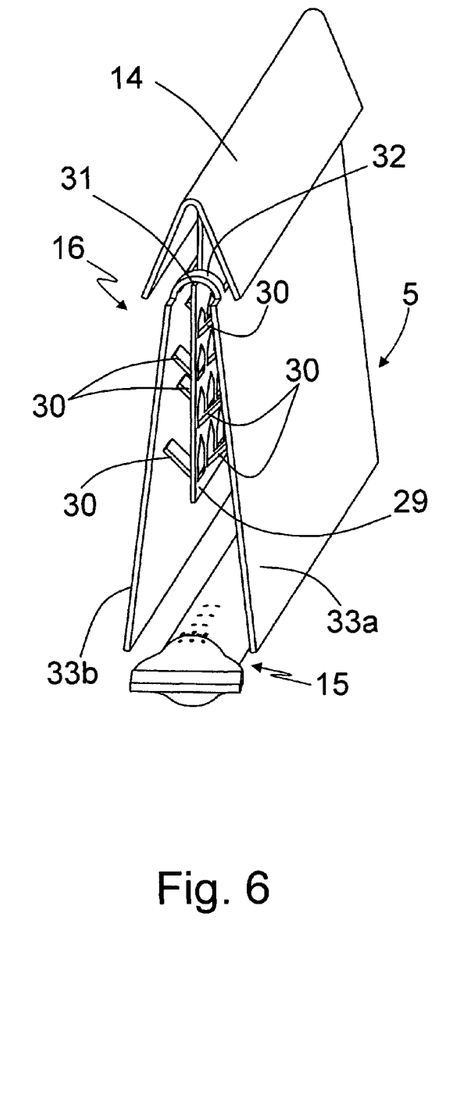
FIG. 6 is a prospective view of the radiating element of another embodiment of a smokeless barbecue according to the invention.
Figure 7:
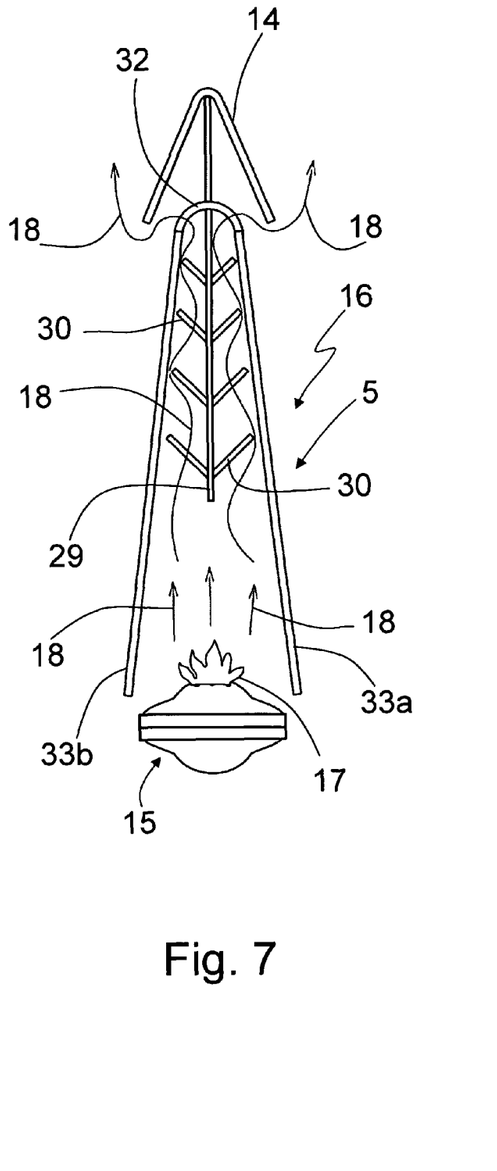
FIG. 7 is a frontal view of the radiating element of FIG. 6.

In FIGS. 6 and 7 it is illustrated another possible embodiment of the radiating element of a smokeless barbecue according to the invention, which differs from the radiating elements illustrated with regard to FIGS. 2, 3 and 4, and with FIG. 5 only because of the radiating body 16.

In fact in this case the radiating body 16 advantageously comprises a substantially vertical plate 29, hanged over a gas burner 15, analogous to the one illustrated in FIGS. 2, 3, 4, and 5, by means of a suitable hanging device, not illustrated.

The substantially vertical plate 29 is preferably fixed, with its upper extremity, to the overlaying cover device 14.

From the substantially vertical plate 29 there protrude a plurality of fins 30, preferably staggered, cut in the substantially vertical plate 29 and bent outwardly from the substantially vertical plate 29.

Advantageously, in proximity to the upper extremity of the substantially vertical plate 29 there is obtained a overhang 31, adapted to support a bridge 32 connecting two radiating sheets 33a, 33b, advantageously metallic, placed sideways to the substantially vertical plate 29, so as to enclose the latter.

Advantageously the free extremities the radiating sheets 33a, 33b are placed in such a way to enclose the flame 17 produced by the gas burner 15.

In this embodiment the hot fumes 18 produced by the flame 17 rise between the two radiating sheets 33a, 33b, colliding with the latter and also with the substantially vertical plate 29 and with the fins 30; the presence of the fins 30 increases the turbulence of the hot fumes 18, improving the heat exchange with the radiating sheets 33a, 33b. The radiating sheets 33a, 33b increase therefore their temperature, and start radiating heat, mainly in a direction substantially parallel to the grill, so as to irradiate the reflecting surfaces, not illustrated in FIGS. 6 and 7.

The fumes 18, cooled by the contact with the fins 30, the vertical plate 29, and the radiating sheets 33a, 33b, exits from the gaps between the two radiating sheets 33a, 33b and the cover device 14 at a relatively low temperature, adapted not to overheat the overlying cover device 14.

Also in this embodiment, next to one or both radiating sides of the radiating element 5 there could be placed a screen, not illustrated in FIGS. 6 and 7, transparent to the radiating heat and adapted to laterally shield the contiguous radiating side of the radiating element 5 from the flammable substances coming out from the food and falling from the grill 2.

Figure 8:
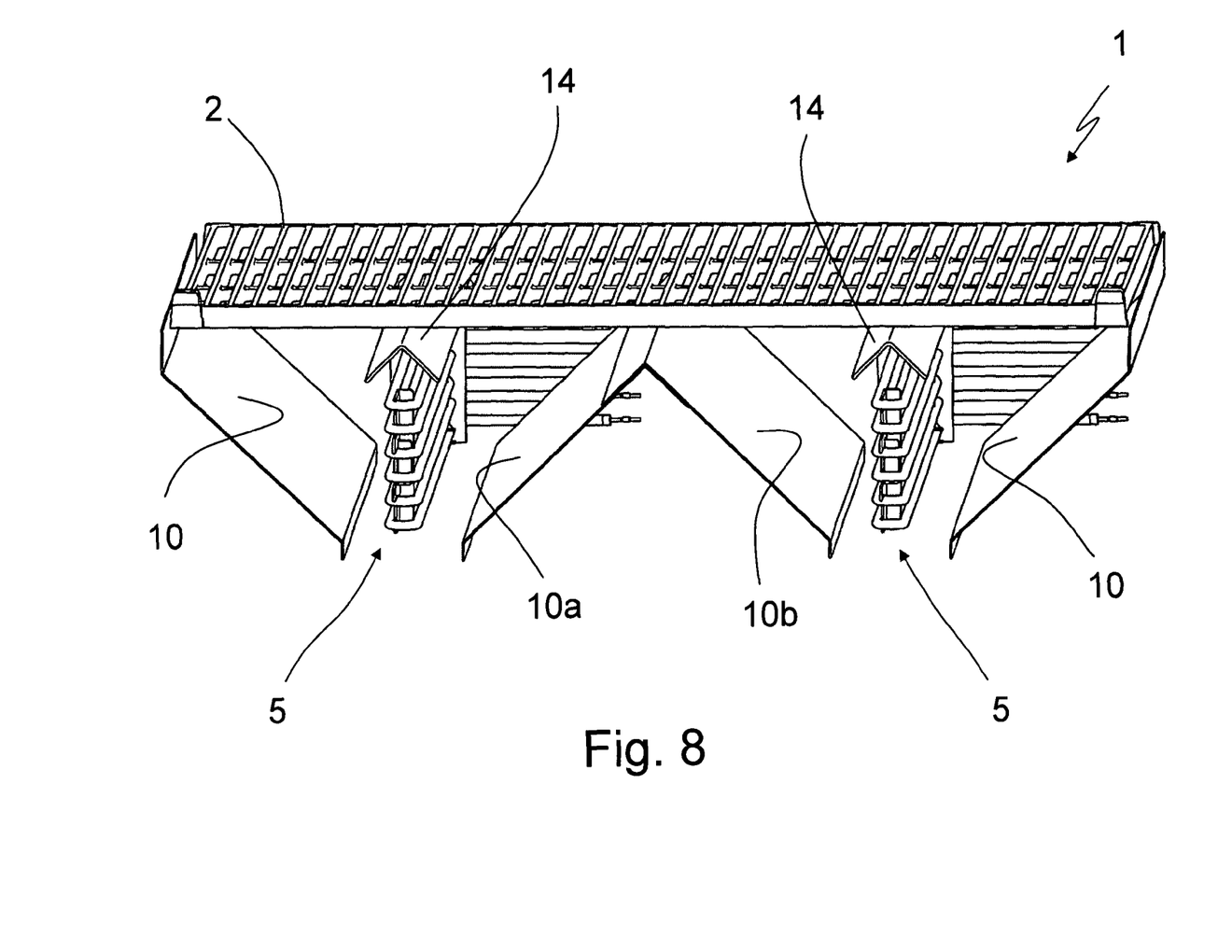
FIG. 8 is a schematic view of a further embodiment of a smokeless barbecue according to the invention.

In a further embodiment, illustrated in FIG. 8, underneath the grill 2 of the smokeless barbecue 1 there are placed two radiating elements 5, preferably one parallel to the other, each one covered by a cover device 14 adapted to shield the radiating element 5 from flammable substances, such as grease, juices, drippings, etc., coming out from the food and falling from the grill 2.

In this embodiment the radiating side of each radiating element 5 opposite to the other radiating element 5 faces a reflecting surface 10, adapted to reflect towards the grill 2 the radiating heat coming from the radiating element 5.

Between the two radiating elements 5 there are placed two further reflecting surfaces, numbered 10a, 10b, each one facing another radiating side of one of the radiating elements 5, so as to reflect towards the overlying grill 2 the radiating heat coming from the contiguous radiating element 5.

Advantageously the two further reflecting surfaces 10a and 10b can be fixed to each other, so as to constitute a reverse V-shaped body.

The embodiment illustrated in FIG. 8 allows obtaining a smokeless barbecue 1 with a wider grilling area, with a good heat distribution and without the production of smoke due to the ignition of the substances coming out from the food.

Also in this embodiment, next to one or more radiating side of each radiating element 5 there could be placed a screen, not illustrated in FIG. 8, transparent to the radiating heat and adapted to laterally shield the contiguous radiating side from the flammable substances coming out from the food and falling from the grill 2.

In another embodiment, not illustrated, under the grill there could be provided a suitable number of radiating elements, substantially parallel to each other so as to constitute a row, each one covered by a cover device; between each couple of contiguous radiating elements there is advantageously placed a couple of reflecting surfaces adapted to reflect towards the grill the radiating heat coming from the faced radiating element. Sideways to the two radiating elements placed at the extremities of the row, externally to said row, there are also placed respectively two reflecting surfaces, adapted to reflect towards the grill the radiating heat coming from these radiating elements. In this way it is possible to obtain a smokeless barbecue with a grill of the whished length.

It is seen therefore how the invention achieves the proposed aim and objects, there being provided a barbecue which, thanks to the reflection of the heat radiation obtained by the presence of the reflecting surfaces, and also thanks to the presence of the cover device, allows obtaining an optimal smokeless grilling of the food.

The presence of the reflecting surfaces increase the area of the overlying grill which can be radiated by a single radiating element; this allows to obtain a smokeless barbecue with a fairly wide grilling area using a reduced number of radiating elements, thus reducing the costs of the barbecue with respect to the prior art.

Moreover, using a gas burner and a radiating body according to the invention, it is possible to improve the heat exhange between the fumes and the radiating body, increasing in such a way the fraction of heat which is transmitted by radiation to the food and improving, as a consequence, the cooking of the food.

In addition, the use of the transparent screens to protect the radiating element reduces further on the risk of the formation of smoke, allowing at the same time to the radiated heat to be reflected by the reflecting surfaces towards the grill, so as to obtain an optimal grilling of the food placed on the latter.

The invention claimed is:
1. A smokeless barbecue comprising:
   a grill adapted for receiving food to be cooked thereon;
   a radiating element underneath said grill;
   a cover device between said grill and said radiating element to shield said radiating element from substances falling from said grill; and
   a reflecting surface facing said radiating element, said reflecting surface being substantially planar and arranged at an oblique angle to said grill to reflect, towards said grill, heat radiating from said one radiating element, wherein said radiating element comprises a gas burner and a radiating body over said gas burner and under said cover device, said radiating body being adapted, when heated by a flame and by hot fumes produced by said gas burner, to emit heat to irradiate said reflecting surface, wherein said reflecting surface has a bottom edge, wherein said radiating body is arranged at or above the bottom edge of said reflecting surface, and wherein said bottom edge of said reflecting surface is below a bottom of the radiating body, and wherein the one reflecting surface has a top edge above a top of the radiating body.

2. A smokeless barbecue comprising a grill adapted for receiving food to be cooked thereon, a radiating element underneath said grill, and a cover device between said grill and said radiating element, wherein said radiating element comprises:

a gas burner; and a radiating body, said radiating body being over said gas burner and under said cover device and being adapted, when heated by a flame and by hot fumes produced by said gas burner, to emit heat by radiation, wherein said radiating body comprises a reverse V-shaped radiating plate comprising two divergent plane branches, wherein free extremities of said two divergent branches enclose said flame produced by said gas burner, wherein said radiating body comprises an opening for flow of said fumes, and wherein said radiating body is arranged so as to irradiate a reflecting surface facing said radiating body and arranged so as to reflect, towards said grill, the heat radiating from said radiating body, said reflecting surface having a bottom edge, wherein said radiating body is arranged at or above the bottom edge of said reflecting surface.

3. The smokeless barbecue according to claim 2, wherein said radiating body is arranged so that heat generated by said gas burner radiates from said radiating body at a relatively small angle with respect to an axis that is parallel to a grid plane of said grill.

4. A smokeless barbecue comprising:

a grill adapted for receiving food to be cooked thereon;

a reflecting surface; and a radiating element underneath said grill, wherein said reflecting surface is arranged to reflect, towards said grill, heat radiating from said radiating element, said reflecting surface having a bottom edge, wherein said radiating body is arranged at or above the bottom edge of said reflecting surface; and a cover device between said grill and said radiating element to shield said radiating element from substances falling from said grill, wherein said radiating element comprises a gas burner and a radiating body, said radiating body being over said gas burner and under said cover device and being adapted, when heated by a flame and by hot fumes produced by said gas burner, to emit heat by radiation, said radiating body being arranged to radiate said heat in a direction towards said reflecting surface, wherein said radiating body comprises a reverse V-shaped radiating plate comprising two divergent substantially planar branches connected to define a closed apex, wherein free extremities of said two divergent branches enclose said flame produced by said gas burner, and wherein an opening extends through said two divergent branches for allowing fumes to flow therethrough.

5. The smokeless barbecue according to claim 4, wherein the smokeless barbecue further comprises a reflecting surface facing one of said two divergent substantially planar branches and arranged so as to reflect, towards said grill, heat radiating from said one of said two divergent substantially planar branches.

6. The smokeless barbecue according to claim 4, comprising a single radiating element under said grill in correspondence to a transverse axis of said grill.

7. The smokeless barbecue according to claim 4, said radiating element being completely covered by said grill.

8. The smokeless barbecue according to claim 4, wherein said cover device comprises a reverse V-shaped beam or tile, over said radiating element and having a length equal to or greater than said radiating element, such that said reverse V-shaped beam or tile completely covers said radiating element.

9. The smokeless barbecue according to claim 4, wherein on the external surface of said two divergent branches there are indentations, each indentation forming a lip protruding from an internal surface of a respective one of said two divergent branches.

10. The smokeless barbecue according to claim 4, wherein said reflecting surface is substantially planar.

11. The smokeless barbecue according to claim 10, wherein said reflecting surface comprises two reflecting surfaces, each of the two reflecting surfaces having a bottom edge, the two reflecting surfaces being arranged at an oblique angle with respect to the grill, the two reflecting surfaces being arranged such that the two reflecting surfaces are arranged on opposite sides of one radiating element from each other, the bottom edge of each of the two reflecting surfaces spaced apart from each other, such that the one radiating element is accommodated in a space between the two reflecting surfaces.

12. The smokeless barbecue according to claim 4, wherein said reflecting surface is disposed at an oblique angle with respect to said grill and is arranged under said grill.

13. The smokeless barbecue according to claim 4, wherein said cover device is a single element.

14. The smokeless barbecue according to claim 8, wherein said cover device is a single element.

15. The smokeless barbecue according to claim 14, wherein said cover device hinders fluid flow therethrough.

* * * * *

UNITED STATES PATENT AND TRADEMARK OFFICE
CERTIFICATE OF CORRECTION

PATENT NO. : 9,591,947 B2  Page 1 of 1
APPLICATION NO. : 13/062775
DATED : March 14, 2017
INVENTOR(S) : Stefano Fogolin It is certified that error appears in the above-identified patent and that said Letters Patent is hereby corrected as shown below:

On the Title Page

Please update the PCT Pub. Date: from "Mar. 18, 2013" to -- Mar. 18, 2010 --

Signed and Sealed this
Twenty-third Day of May, 2017

Michelle K. Lee
*Director of the United States Patent and Trademark Office*